United States Patent [19]

Giandinoto et al.

[11] 3,848,477

[45] Nov. 19, 1974

[54] DEVICE FOR GUIDING AND RESUMING THE AXIAL CLEARANCE IN SCREWS OF REDUCTION WORMS, PARTICULARLY FOR LOW POWER GEARED MOTOR

[75] Inventors: Aldo Giandinoto; Ugo Gilardelli, both of Milan, Italy

[73] Assignee: Fabbrica Italiana Magneti Marelli, S.p.A., Milano, Italy

[22] Filed: Mar. 2, 1973

[21] Appl. No.: 337,714

[30] Foreign Application Priority Data
Mar. 15, 1972 Italy................................ 21884/72

[52] U.S. Cl............................... 74/425, 74/412 TA
[51] Int. Cl............................................. F16h 1/16
[58] Field of Search ....................... 74/412 TA, 425

[56] References Cited
UNITED STATES PATENTS
1,181,384  5/1916  Heaslet................. 74/425
2,747,426  5/1956  Robinson............... 74/425 X
2,780,893  2/1957  Seborg et al........... 74/412 TA UX
3,339,426  9/1967  Borggrafe.............. 74/425
3,511,920  5/1970  Hertfelder............. 74/425 X

*Primary Examiner*—Leonard H. Gerin
*Attorney, Agent, or Firm*—Ostrolenk, Faber, Gerb & Soffen

[57] ABSTRACT

Device for guiding and controlling the axial shifting of the worm in worm reduction gears, including a spring acting upon an end of the worm to counteract its axial thrust, a cap at the end of the worm for radially supporting same and upon which the spring operates and further comprising a wedge shaped block with its inclined surface inclined transversely to the axis of the worm and the spring acting to bias the block transversely to the axis of the worm.

10 Claims, 5 Drawing Figures

PATENTED NOV 19 1974   3,848,477
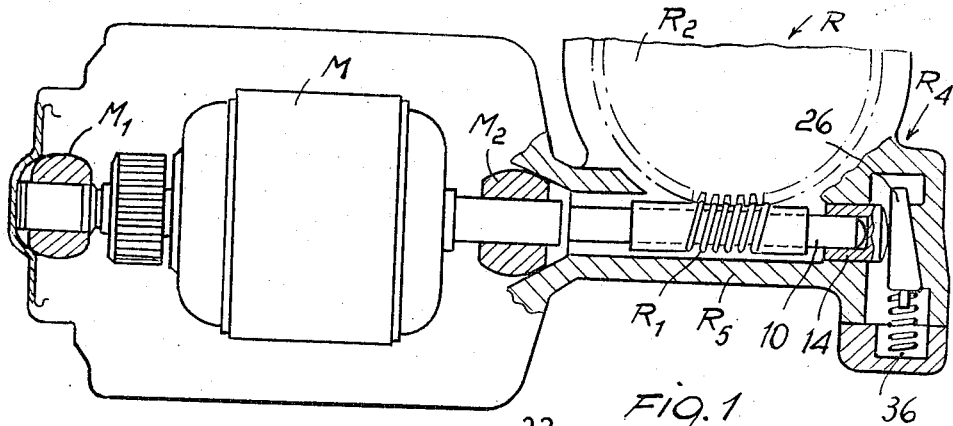
Fig.1
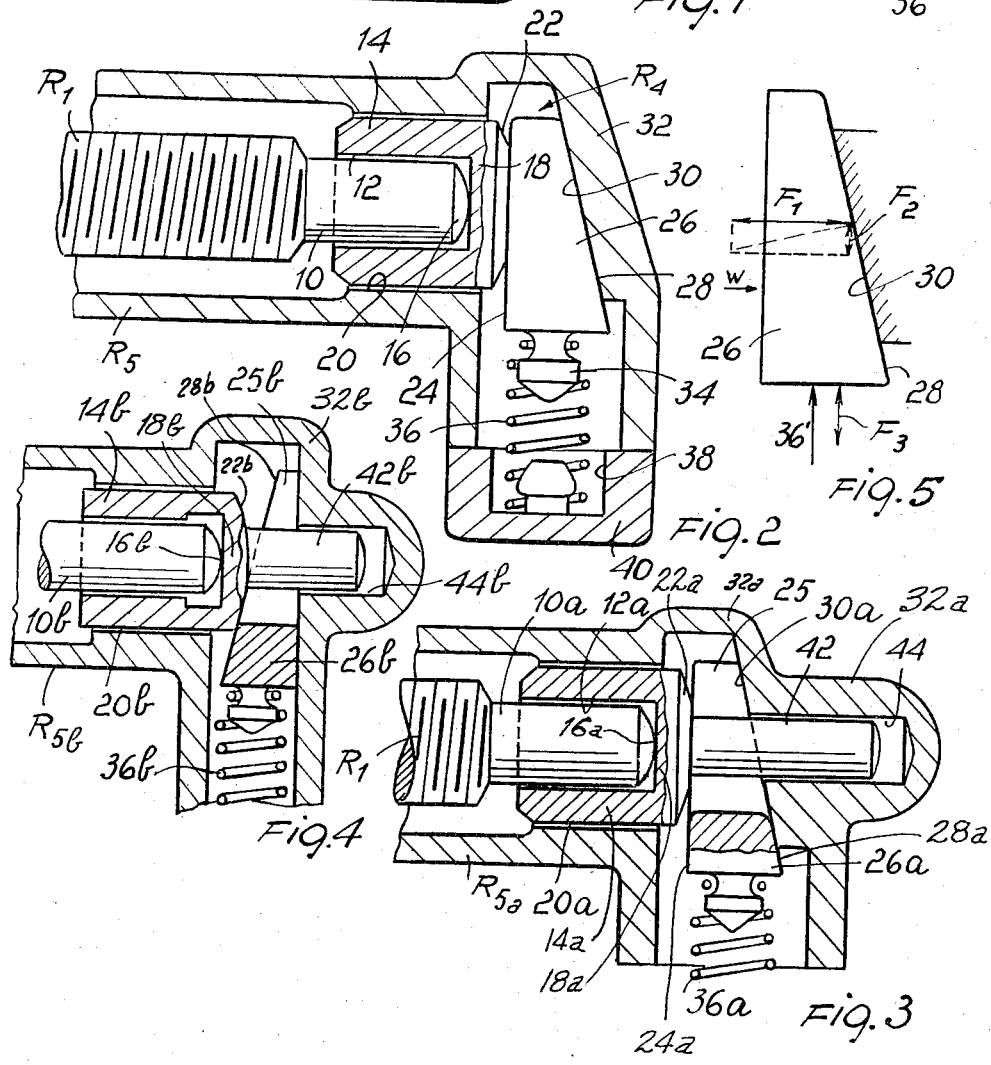
Fig.2
Fig.4
Fig.3
Fig.5

DEVICE FOR GUIDING AND RESUMING THE AXIAL CLEARANCE IN SCREWS OF REDUCTION WORMS, PARTICULARLY FOR LOW POWER GEARED MOTOR

This invention relates to a device applicable to low power reduction wheel-worms as used, for example, on motor vehicles to drive windscreen wipers and for other similar purposes.

Devices are well known for automatically resuming the axial clearance in screws of helical gear-worm geared motors, such clearances being due to the change in the resistent moment occurring in controlling some reciprocating users, such as windscreen wipers. These windscreen wipers include arms which are back and forth moved, whereby the geared motor will undergo torque changes due to force components appearing in the coupling between the thread spiral and the wheel or gear teeth. These torque changes would cause thrusts to be established in both directions along the screw axis.

In view of the particularly intended use of the device according to the invention, that is for windscreen wiper geared motors, and as windscreens become increasingly larger, to increase the drive safety visibility the lengths of the arms and wiping brushes should be increased. Accordingly, it would be necessary to increase the power of the motor driving the windscreen wiper in order to make up for the increased requirements for the windscreen plate glass cleaning. The increased power of the geared motor unit causes an increase in axial thrusts under unaltered characteristics of the worm spiral or helix, whereby the resilient means provided by conventional devices for clearance resumption, (operating with such forces as not to be prejudicial to wear of parts undergoing friction, removing the axial clearances in the screw that would cause a substantial operation noise, even if such forces are ideally applied on the axis and have therefore a zero arm, that is also a zero torque on the screw axis) are no longer sufficient and the load thereof should be increased.

The invention will now be disclosed from the following description referring to the accompanying drawing, in which some embodiments of the device are shown as applied to the worm of a reduction gear of the above type.

In the drawing:

FIG. 1 is a schematic axial sectional view showing the above type of geared motor as used, for example, in windscreen wiper control;

FIG. 2 is an enlarged axial sectional view showing the right-hand end of the geared motor unit of FIG. 1;

FIGS. 3, 4 are sectional views similar to that of FIG. 2, relating to modified embodiments of the device; and FIG. 5 schematically shows the force diagram of the device according to FIGS. 2–4.

Referring to FIG. 1, the geared motor therein shown has a usual motor M, the rotor of which is supported by bearings M1 and M2. The shaft of this rotor is fast with form R1 of the reduction gear R meshing the helical gear R2 and is provided with a member R4 for automatically resuming the clearance of said worm.

According to the present invention, the device R4 for resuming the worm clearance, in addition to removing said clearance will hold the cantilevered end of worm R1 at a guided condition.

In the embodiment shown in FIG. 2, the geared motor worm R1 terminates with a pin 10 threading by a highly restricted clearance in the hole 12 of a cap 14. The end 16 of pin 10 is conveniently rounded and cooperates with the bottom wall 18 of cap 14, thereby providing for resuming the axial clearance of said worm, as hereinafter explained.

The cap 14 is held at a guided condition within a seating 20 formed in the casing R5 housing the reduction gear unit R, so that said cap is radially restrained, while being capable of freely moving along its own axis.

At its rear end said cap 14 terminates with a flat or rounded wall 22, the flat front side 24 of a prismatic block 26 cooperating therewith. The side 28 of said block opposite to side 24 is conveniently inclined to upward converge and cooperates with a corresponding inclined surface 30 of the bottom wall 32 of casing R5.

At its lower end said block 26 has a grooved pin 34 retaining one end of a helical spring 36, the other end of which is retained by the bottom of a seating 38 in the cover 40 of said casing R5.

Said spring 36 acts to upward urge the prismatic block 26, thereby assuring that the bottom 18 of cap 14 engages against the rounded end 16 of pin 10 associated with the worm R1 of the reduction gear.

The operation of the device described is apparent from FIG. 5, where arrow W is the axial force generated by the resistent moment on the axis of pin 10, whereas arrow 36' is the force exerted by spring 36 on block 26. In this figure, F1 and F2 designate the component forces whether the drive torque operates on worm R1 in the direction as shown by arrow W, or the action of spring 36 operates thereon in the direction of arrow 36'. It should be also noted that the radial clearances, particularly those resulting from the bending of worm R1, are controlled and limited by cap 14 which can rotate in seating 20. Thus, the wear between the moving parts and the torque provided by the bias of spring 36 are reduced, since the arm to which said bias is applied is at a maximum determined by the only difference between the radii of pin 10 and hole 12 of cap 14, assuming that the centers of said radii are not coincident owing to the clearances between these parts. The efficiency of this reduction gear unit is by far higher than that obtainable by conventional reduction gears having the same features. The bias exerted by spring 36 on the wedge-like block 26 (see FIG. 5) can be provided of a very small rate, because of being resolved in force F1 directed along the axis of worm R1, however reduced by the frictions due to the engagement of surfaces 22–24 and 28–30. Conversely, where a high bias F1 occurs in the direction of arrow W, said bias will compress spring 36 by a force F3 reduced by the frictions caused by surfaces 22–24 and 28–30. As a result, while using a spring 36 having a limited load, high axial thrusts W due to worm R1 engaging the associated gear or wheel R2 and slope of the thread of said worm can be controlled, and this because of the frictions occurring between said surfaces 22–24 and 28–30, thereby removing the noise and chattering, as experienced by the rotor of motor M, particularly occurring when the reduction gear operates users subjected to sharp periodical changes in the resistent moment.

FIGS. 3 and 4 show modified embodiments of the device according to the invention, where like or equivalent parts are designated by same reference characters. According to FIG. 3, cap 14a has at its bottom wall 18a a pin 42, engaging in a respective hole 44 in the bottom wall 32a of the reduction gear casing R5a for further guiding said cap 14a as the latter axially moves. In this case, block 26a is provided with a slit 25, through which said pin 42 passes.

FIG. 4 shows a further modified form of the device according to the invention using the same reference characters with the suffix 6, wherein the wedge-like block 26b cooperates with its inclined side 28b with the bottom wall 22b of cap 14b.

The device herein described and shown can contemplate modifications and changes in view of the requirements to be occasionally met.

What is claimed is:

1. Device for automatically absorbing the axial motion of a gear worm, which motion results from engagement of the worm with a reciprocating element or the like, comprising:
   a motor, a motor shaft driven by said motor; said shaft having an axis; a gear worm secured on and coaxial with said motor shaft, such that said motor drives said shaft and said gear worm to rotate; said shaft having a free end which undergoes axial shift due to axial force applied to said worm;
   wedge means in communication with said shaft free end; said wedge means being shaped and positioned such that reciprocation thereof transversely to said shaft axis reciprocates said shaft along said axis, and said wedge means being shaped such that reciprocation of said wedge means in one direction thrusts said shaft axially away from said wedge means; spring means connected to said wedge means for reciprocating said wedge means in said one direction.

2. The device of claim 1, wherein said wedge means comprises a block that is in communication with said shaft free end and that reciprocates transversely with respect to said shaft axis; said wedge means further comprises an abutment which is fixed in position relative to both of said shaft and said block; said block having a first surface in engagement with said abutment and a second surface generally on the opposite side of said block from said first surface and in communication with said shaft free end; at least one said block surface being inclined with respect to said shaft axis; whereby as said block reciprocates, it axially shifts said shaft and said worm.

3. The device of claim 2, wherein said block inclined surface is said first surface thereof.

4. The device of claim 2, wherein said block inclined surface is said second surface thereof.

5. The device of claim 2, further comprising:
   a support casing surrounding said shaft in the vicinity of said shaft free end;
   a centering bushing in said casing, said bushing being of a cross sectional size to be held in said casing so as to only be axially slidable through said casing; said bushing having a receiving opening of a cross sectional size approximating that of said shaft in the vicinity of said free end thereof; said shaft free end extending into said bushing and said shaft being held and supported against shifting, other than axial shifting of said shaft, by means of said bushing and said casing; said bushing including an end wall which is engaged on one side by said shaft free end and which is engaged on the opposite side by said second block surface.

6. The device of claim 5, wherein said casing extends past said bushing and said shaft free end toward and beyond said block and behind said first surface of said block; said block having a clearance opening extending therethrough; said bushing having an extension projecting through said block clearance opening; the portion of said casing behind said block first surface being shaped to define a receiving opening that is dimensioned and of a length to receive said bushing extension to permit axial shifting of said bushing extension and being of a cross section approximating that of said bushing extension to prevent shifting, other than axial shifting, of said bushing extension; said bushing extension extending into said casing opening.

7. The device of claim 5, wherein said support casing has said block and said spring means positioned therein; said block engaging abutment being fixedly positioned with respect to said block within said casing; said spring means extending between and being compressed between said casing and said block.

8. The device of claim 7, wherein said block inclined surface is said first surface thereof.

9. The device of claim 7, wherein said block inclined surface is said second surface thereof.

10. The device of claim 2, further comprising a support casing in which said block and said spring means are positioned; said block engaging abutment being fixedly positioned with respect to said block within said casing; said spring means extending between and being compressed between said casing and said block.

* * * * *